July 16, 1935.  E. GROSS  2,008,498

PROTECTIVE ARRANGEMENT FOR ELECTRIC SYSTEMS

Filed April 13, 1932  2 Sheets-Sheet 1

Inventor:
Erich Gross,
by Charles E. Tullar
His Attorney.

Inventor:
Erich Gross,
by Charles E. Mullen
His Attorney.

Patented July 16, 1935

2,008,498

UNITED STATES PATENT OFFICE 2,008,498

PROTECTIVE ARRANGEMENT FOR ELECTRIC SYSTEMS

Erich Gross, Vienna, Austria, assignor to General Electric Company, a corporation of New York Application April 13, 1932, Serial No. 605,060 In Germany April 14, 1931

10 Claims. (Cl. 175—294)

My invention relates to improvements in protective arrangements for electric systems and more particularly to improvements in protective arrangements which embody so-called distance relays; that is, fault responsive relays whose time of operation is dependent on an impedance characteristic of the circuit to be protected between the relay location and the fault. An object of my invention is so to control the relation between the current and voltage energizations of the distance relay as to maintain its time of operation at a definite value corresponding to the distance between the relay and a fault independently of the number of circuit conductors involved in the fault on the basis that each different kind of fault has of itself the same impedance characteristic, for example the same ohmic impedance, resistance or reactance depending on which one of these the relay is designed for operation.

Arrangements are known for so changing the circuits of the current and voltage coils of distance relays that the differences of the voltage distribution in the case of grounding of one or two conductors and of other kinds of faults are compensated in their effect on the relays. In all these arrangements, however, a fault such as a short-circuit involving all the circuit conductors is not differentiated from a fault involving only two of the circuit conductors, and consequently different operating times result in these cases even though the fault is in each case at the same distance from the relay. In accordance with my invention, I provide an arrangement for so controlling the relation between the current and voltage energizations of the distance relays as to match an effective impedance characteristic of the circuit between the relay and a fault and thereby eliminate the time variations and their disadvantages. By impedance characteristic of the circuit, I mean either impedance or a component thereof.

My invention will be better understood from the following description when considered in connection with the accompanying drawings, and its scope will be pointed out in the appended claims.

Figure 1:
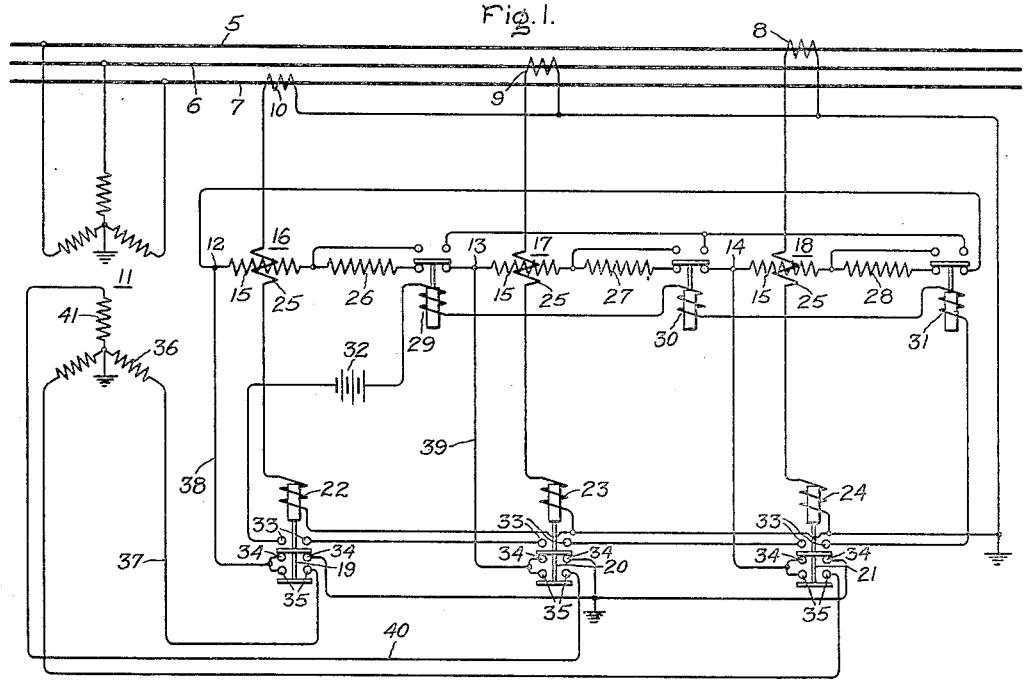
Figure 2:
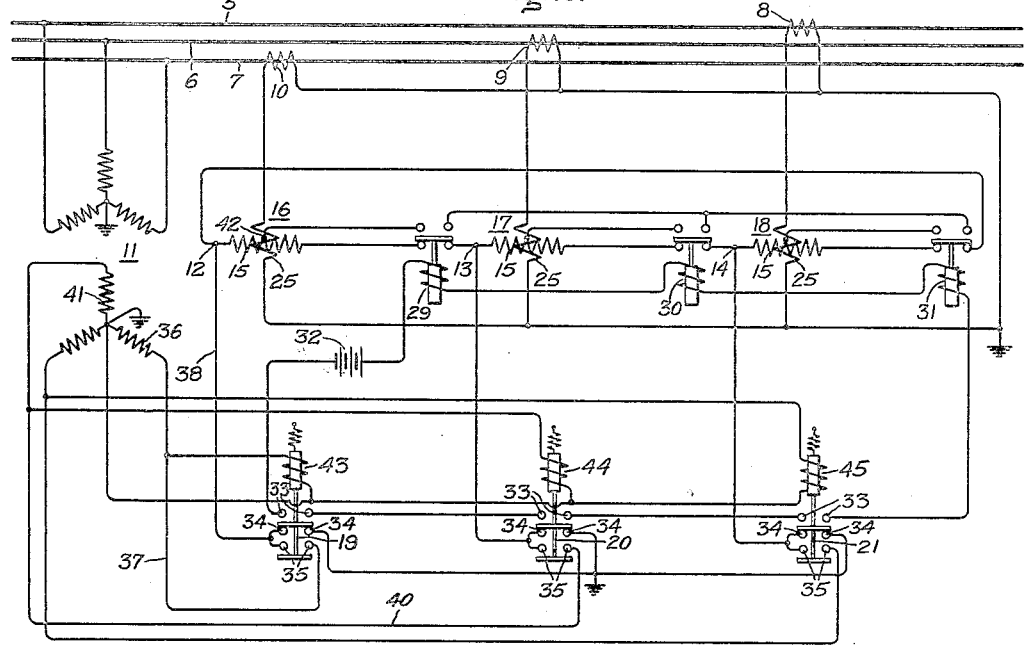
Figure 3:
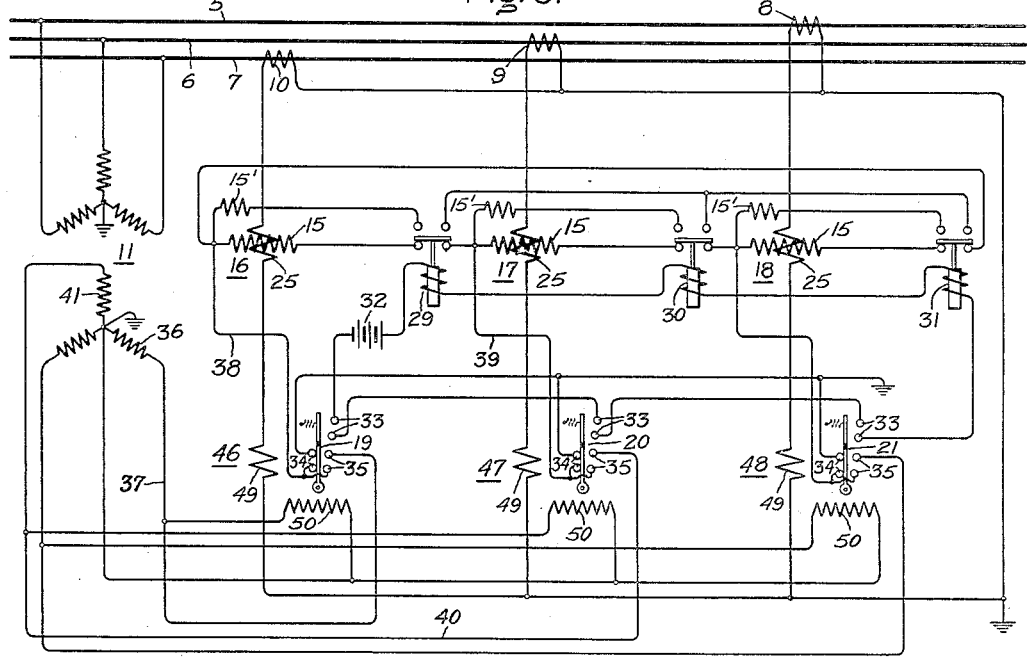
Figure 4:
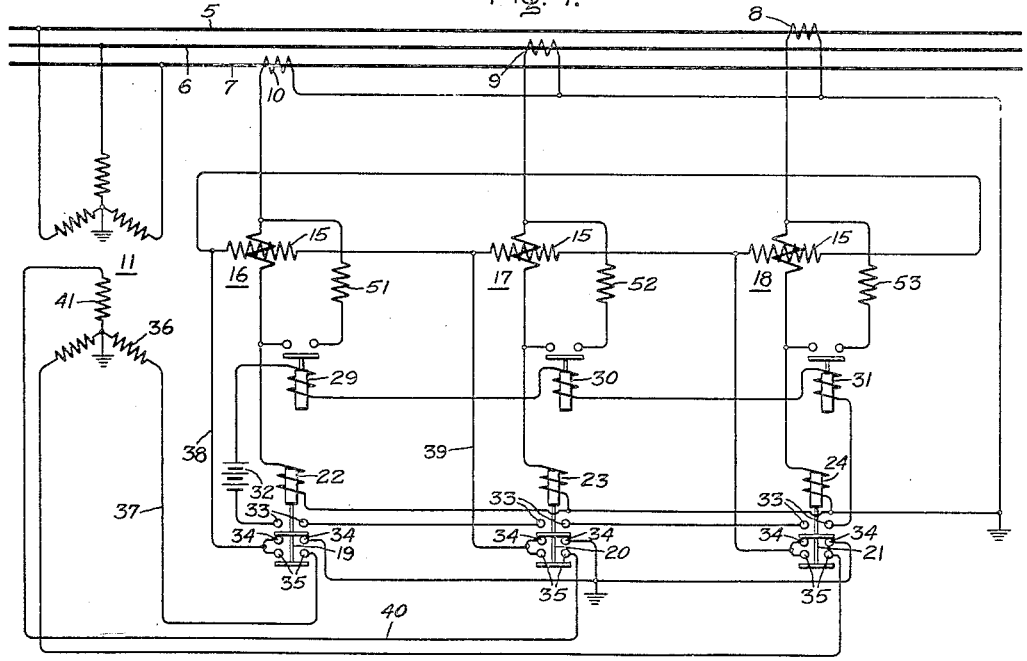

In the accompanying drawings, Fig. 1 illustrates diagrammatically a protective arrangement embodying my invention, and Figs. 2, 3 and 4 illustrate diagrammatically modifications of my invention.

In all the figures I have illustrated my invention as applied to a polyphase electric system embodying a three-phase circuit having phase conductors 5, 6 and 7. In order to avoid the confusion of trip circuits and the like, I have omitted these and the circuit breakers themselves, since the application thereof is well known to those skilled in the art. The current and voltage energizations for the fault responsive devices may be obtained from current transformers 8, 9 and 10 and a polyphase potential transformer 11 connected to the circuits 5, 6, 7.

In the embodiment of my invention shown in Fig. 1, I avoid the disadvantage of different times of operation by connecting the normally grounded points 12, 13, 14 of a delta which is formed by the voltage coils 15 of the time relays 16, 17, 18 of the distance protective arrangement to the circuit voltage concerned by transfer switches 19, 20, 21, respectively, controlled by fault-responsive starting relays 22, 23, 24. These may be of the overcurrent type as illustrated in Fig. 1.

As shown in Fig. 1, the current coils 25 of the time relays 16, 17, 18 and the coils of the starting relays 22, 23, 24 are connected in star with the current transformers 8, 9, 10. The voltage coils 15 of the relays 16, 17, 18 are combined in a delta arrangement in series with suitable impedance devices 26, 27, 28. By transfer switching means 29, 30 and 31, the delta connection can be changed so that the voltage coils 15 are connected in star without the impedance devices 26, 27 and 28. The impedance values of the devices 26, 27, 28 substantially correspond to the impedances of the voltage coils 15 with which they are associated.

The transfer switching means 29, 30, 31 may be of the electromagnetic type, as shown. They are arranged to have their operating windings connected in series with a suitable source of current 32 through the top contacts 33 of the transfer switches 19, 20, 21 in series. These transfer switches are also provided with contacts 34 and 35, which are connected on one side to the points 12, 13 and 14 of the voltage coils' delta and on the other side to ground and to the phase conductors 5, 6, 7, respectively.

Assuming a fault to ground on the conductor 7 at a given distance from the relay location, then the overcurrent relay 22 will respond and connect the voltage winding 15 of the distance relay 16 for energization in accordance with the voltage to ground of the conductor 7. The circuit is from the grounded neutral of the secondary of the potential transformer 11, the winding 36 corresponding to the grounded conductor, conductor 37, contacts 35 of the overcurrent relay 22, conductor 38, winding 15 of relay 16, impedance device 26, the closed contacts of transfer relay 29, conductor 39 and contacts 34 of the overcurrent relay 23 to ground. The distance relay 16 is, therefore, energized in accordance with the current and the voltage most affected by the fault.

Assuming a fault between the phase conductors 6 and 7 at the same given distance from the relay location, then both overcurrent relays 22 and 23 will respond and connect the voltage winding 15 of the distance relay 16 for energization in accordance with the voltage between conductors 6 and 7. The circuit includes potential transformer secondary 36, conductor 37, contacts 35 of the overcurrent relay 22, conductor 38, voltage winding 15 of relay 16, impedance device 26, closed contacts of the transfer relay 29, conductor 39, contacts 35 of the overcurrent relay 23, conductor 40 and potential transformer secondary 41. Again it is clear that at least one of the distance relays is energized by the current and the voltage most affected by the fault.

Assuming a fault at the same given distance from the relay location involving all the phase conductors, then every one of the overcurrent relays 22, 23, 24 operates to close its contacts 33, thereby completing the circuit of the transfer relays 29, 30 and 31. The operation of the transfer relays 29, 30 and 31 takes the impedance devices 26, 27 and 28 out of circuit with their respective voltage coils, thus reducing the impedances of the circuits of these coils by substantially one-half to correspond with the reduction in the effective impedance of the circuit between the relay location and the fault point by reason of the fact that the fault involves all of the conductors. In consequence of the operation of the transfer relays 29, 30 and 31, the points of the voltage coils 15 which are normally connected to earth are now connected together in star so that the coils are energized in accordance with the corresponding voltage to earth, since each of the overcurrent relays operates to close its contacts 35 in the circuit of the voltage coils 15 and the secondary windings of the potential transformer 11. Thus, in case of a short-circuit involving all the phase conductors, the voltage coils are excited with the full star voltage but with a two-phase short-circuit or an earth they are energized by half the interlinked or earth voltage. Consequently, in all cases of faults at a given location, the relays at a given location will operate in the same time.

Instead of using the impedance devices 26, 27, 28, the voltage coils 15 of the distance relays 16, 17, 18 may be provided with taps 42 so that in the case of delta connection of the voltage coils the entire voltage winding is available for operation, but in the case of star connection of the voltage coils approximately only half of the voltage coils are in circuit. Such an arrangement is shown in Fig. 2. Also, as shown in this figure, instead of using overcurrent fault responsive relays 22, 23 and 24 to operate the transfer switches 19, 20 and 21, there may be used undervoltage relays 43, 44, 45. The operation of this modification of my invention will be obvious from the description of the embodiment of my invention shown in Fig. 1.

As shown in Fig. 3, the voltage energization of the distance relays 16, 17, 18 may be effected by two windings 15, 15', the former being in circuit in the case of the delta connection of the voltage windings, and the latter of approximately half the impedance being in circuit in the case of star connection of the voltage windings. Also, as shown in Fig. 3, the fault responsive means for controlling the transfer switches 19, 20 and 21 may be of the impedance type. In other words, there may be employed relays 46, 47, 48 which respond to the ratio of the voltage and the current for controlling the transfer switches 19, 20 and 21 to accomplish the same transfer switching connections as is done by the overcurrent relays 22, 23 and 24 of Fig. 1 or the undervoltage relays 43, 44 and 45 of Fig. 2. Each of these impedance relays has a current winding 49 and a voltage winding 50 connected to be energized from the current transformers 8, 9 and 10 and the potential transformer 41 in a manner known to the art.

Instead of varying the energization of the voltage circuit of the distance relays 16, 17, 18, the energization of the current circuit can be varied in the case of a fault involving all the phase conductors so that in this case additional impedance devices of substantially equal impedance are connected in parallel with the current coils. Such an arrangement is shown in Fig. 4, wherein the impedance devices 51, 52, 53 are arranged to be connected in parallel with the current windings 25 of the respective distance relays 16, 17, 18 by the transfer relays 29, 30 and 31. The operation of this modification of my invention will be obvious from what has heretofore been explained in view of the difference pointed out above.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, a polyphase circuit, fault responsive protective means therefor including a distance relay arranged to be energized in accordance with a voltage and a current of the circuit for operation in accordance with an impedance characteristic of the circuit between the relay location and a fault, and means for maintaining the time of operation of the distance relay at a substantially definite value corresponding to the distance between the relay and the fault independently of the number of phase conductors of the circuit involved including a single line to ground fault, comprising means responsive to abnormal circuit conditions for controlling the relation between the voltage and current energizations of the distance relay.

2. In combination, a polyphase circuit, fault responsive protective means therefor including a distance relay arranged to be energized in accordance with a voltage and a current of the circuit for operation in accordance with an impedance characteristic of the circuit between the relay location and the fault, and means for maintaining the time of operation of the distance relay at a substantially definite value corresponding to the distance between the relay and a fault independently of the number of phase conductors of the circuit involved including a single line to ground fault, comprising means responsive to abnormal circuit conditions for selecting the voltage energization of the distance relay.

3. In combination, a polyphase circuit, fault responsive protective means therefor including a distance relay having cooperating current and voltage windings arranged to be energized in accordance with a voltage and a current of the circuit for operation in accordance with an impedance characteristic of the circuit between the relay location and a fault, and means for maintaining the time of operation of the distance relay at a substantially definite value corresponding to the distance between the relay and a fault independently of the number of phase conductors of the circuit involved including a single line to ground fault, comprising means responsive to abnormal circuit conditions for selectively controlling the voltage of the circuit applied to the voltage winding of the distance relay.

4. In combination, a polyphase circuit, fault responsive protective means therefor including time element relays arranged to be energized for operation in accordance with a predetermined relation between a voltage and a current of the circuit, means operative on the occurrence of a fault involving only one circuit conductor and ground or a fault involving only two circuit conductors for selectively effecting the energization of at least one of said relays in accordance with the voltage most affected by the fault, means operative on the occurrence of a fault involving all circuit conductors for varying the relation between the voltage and the current energizations of the relays and means controlled by said fault operative means for effecting a substantially constant impedance characteristic response from at least one of the relays for faults at a given distance from the relays independently of the number of phase conductors of the circuit involved in the faults.

5. In combination, a three-phase circuit, fault responsive protective means therefor including distance relays having cooperating current and voltage windings and means operative on the occurrence of a three-phase fault for connecting the voltage windings of the respective relays for energization in accordance with the star voltages of the circuit.

6. In combination, a three-phase circuit, fault responsive protective means therefor including distance relays having cooperating current and voltage windings, means for selectively effecting the energization of the voltage winding of at least one of said relays on the occurrence of a fault involving only one circuit conductor and ground or a fault involving only two circuit conductors in accordance with the voltage most affected by the fault and means operative on the occurrence of a fault involving all circuit conductors for connecting the voltage windings of the respective relays for energization in accordance with the star voltages of the circuit.

7. In combination, a polyphase circuit, fault responsive protective means therefor including a distance relay connected to be energized in accordance with a voltage and a current of the circuit for operation in accordance with an impedance characteristic of the circuit between the relay location and a fault and means operative in response to faults for maintaining the impedance characteristic response of said relay substantially constant for faults at a given location independently of the number of phase conductors of the circuit involved including a single line to ground fault.

8. In combination, a polyphase circuit, fault responsive protective means therefor including only one distance relay element for each phase of the circuit, said elements being respectively connected to be energized in accordance with the currents in the phase conductors of the circuit and voltages derived from the circuit for operation in accordance with an impedance characteristic of the circuit between the relay location and the fault and means operative in response to faults for maintaining the impedance characteristic response of said relay elements substantially constant for faults at a given location independently of the number of phase conductors of the circuit involved including a single line to ground fault.

9. A protective arrangement for a polyphase alternating-current power system including distance relays having cooperating voltage and current coils one terminal of each of the voltage coils being connected to the same point and the current coils being connected to be energized respectively in accordance with the currents in the phase conductors of the system, and fault-responsive relays respectively associated with the phase conductors of the system and means including contacts controlled by said fault-responsive relays for normally connecting the other terminal of each voltage coil to a neutral point of the system and for connecting the other terminal of a voltage coil to the phase conductor of the system from which the cooperating current coil is energized upon the occurrence of a fault involving said phase conductor.

10. In combination, a polyphase circuit, fault responsive protective means therefor including a distance relay arranged to be energized in accordance with a voltage and a current of the circuit at the relay location for operation in accordance with an impedance characteristic of the circuit between the relay location and a fault, and means operative on the occurrence of a fault at a given point for controlling the relation between the current and voltage energizations of the relay substantially to match an effective impedance characteristic of the circuit between the relay and the fault location independently of the number of phase conductors involved including a single line to ground fault.

ERICH GROSS.